Jan. 20, 1959  J. K. SMITH ET AL  2,869,774
REMOVABLE HUB
Filed Aug. 23, 1955

INVENTORS,
JULIAN K. SMITH &
LOUIS A. KOVACS
BY
Woodling and Krost
atty.

United States Patent Office 2,869,774
Patented Jan. 20, 1959

2,869,774

REMOVABLE HUB

Julian K. Smith and Louis A. Kovacs, Cleveland, Ohio, assignors to The Reliance Electric & Engineering Company, a corporation of Ohio Application August 23, 1955, Serial No. 530,082

6 Claims. (Cl. 230—134)

The invention relates in general to readily removable hub connections and more particularly to a compressive type hub such as for a fan assembly wherein a compressive force is applied to a hub to contract a shaft aperture to hold the hub onto the shaft within the aperture.

Many prior art forms of hub assemblies, either split hubs or semi-split hubs, have been devised and used and a typical contractable split hub assembly is one wherein the hub has a semi-cylindrical portion integrally attached to a rotatable body such as a fan, and another completely separate semi-cylindrical strap complementarily engages the integral hub portion to surround a shaft and connect the hub thereto. In the prior art semi-split hub constructions the hub may have only a single slot extending radially from a shaft aperture, and the hub may be compressed at this radial slot to contract the shaft aperture and thus fasten the hub to the shaft.

In these prior art constructions the hub contains one or more slots which are open on one face of the hub, and thus dirt and other foreign matter may readily enter this slot to thus be instrumental in aiding passage of this foreign matter between the shaft and the shaft aperture to the other side of the hub. In electric motors, for example, fans are often used next to the rotor and adjacent to a bearing; and thus foreign matter being able to have access to the bearing, is detrimental to proper motor operation.

Accordingly, an object of the invention is to provide a hub connecting means such as for a fan assembly on a rotatable shaft wherein a completely closed face of the hub is obtained at least when the hub is on the shaft.

Another object of the invention is to provide a readily removable retaining hub for a rotatable device mounted on, and in driving connection with, a shaft.

Another object of the invention is to provide a one-piece hub of plastic material which is suitably strong but requires no metal inserts or clamping parts except standard type bolts and nuts.

Another object of the invention is to provide a non-metallic corrosion resistant and low cost hub connection.

Another object of the invention is to provide a hub readily removable from a shaft which is fastened with standard type screws or bolts but which does not need any drilled or cored holes in the hub to provide a hub which may readily be cast or molded in a two-part mold for ease and cheapness of manufacture.

Another object of the invention is to provide a readily removable hub which may be compressed for driving connection with a shaft by standard type screws whereby the means of screw insertion into the hub requires a minimum of diametral space.

Another object of the invention is to provide a readily removable ventilating fan made of plastic or other materials which is stressed principally in comparison so that no additional reinforcing members are required.

Another object of the invention is to provide a plastic readily removable hub wherein the clamping action by screws or bolts is effected in such a manner as to avoid excessive stress in the material of the hub.

Another object of the invention is to provide a readily removable ventilating fan which is retained by standard type screws or bolts, yet which requires no drilling or coring in the fan hub material to accommodate the screw shank.

Another object of the invention is to provide a readily removable ventilating fan which is retained by standard type screws and which fan has radial blades limiting the radial distance available between the hub and the blades and whereby the means of screw insertion requires less radial screw insertion or removal space than with a conventional hole to accommodate the screws.

Other objects and a fuller understanding of this invention may be had by referring to the following description and claims, taken in conjunction with the accompanying drawing, in which:

Figure 4:
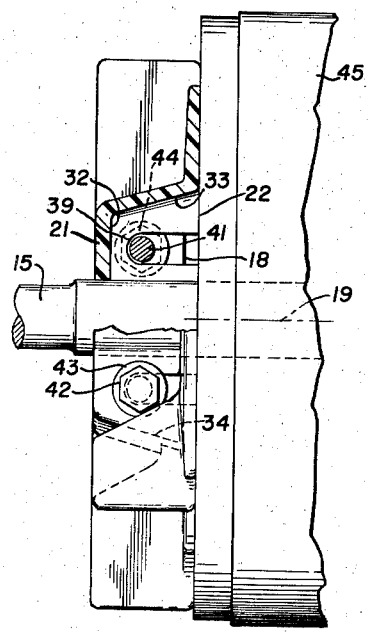
Figure 4 is a side view of the fan assembly partially broken away and shown mounted on a rotatable shaft.

The Figures 1–4 show a fan assembly 11 which includes generally a disc 12, a plurality of fan blades 13, and a hub 14. The fan assembly 11 is illustrative of a rotatable body which may be connected by the hub 14 to a rotatable shaft 15 as shown in Figure 4. In this specific illustration of a fan assembly as one form of a rotatable body, the disc 12 has an outer face surface 18 which is normal to an axis 19. The fan blades 13 are radially disposed on the surface 18 and may extend beyond the disc 12 and extend approximately half way from the outer periphery 20 of the disc to the axis 19.

The hub 14 has first and second faces 21 and 22 with the second face 22 being integral with, and in the plane of, the disc 12. From Figures 1 and 4 it will be noted that the first face 21 of the hub is completely closed, at least closed when mounted on the shaft 15 as shown in Figure 4.

The hub 14 has first and second opposite planar sides 24 and 25 and first and second oppositely disposed arcuate sides 26 and 27. These sides 24 through 27 are on the periphery of the hub 14. A surface 28 in the hub 14 defines a shaft aperture to receive the shaft 15 and preferably is only a few thousandths of an inch larger than the shaft 15.

The opposite planar sides 24 and 25 are parallel to a longitudinal reference plane 30 which is mid-way between these sides 24 and 25 and which contains the shaft axis 19. A longitudinal slot 31 extends completely through the second face 22 of the hub 14 and into the hub 14. This slot 31 has a bottom wall 32 adjacent the closed face 21 of the hub and has side walls 33 and 34 closely adjacent the outer surface of the arcuate sides 26 and 27.

First and second transverse slots 37 and 38 also extend into said hub 14 through the second face 22. These transverse slots each have a bottom wall 39 closely adjacent the closed face 21 of the hub 14 and extend completely through the hub from one planar side 24 to the other planar side 25. These transverse slots 37 and 38 are spaced substantially equidistant on each side of the shaft aperture 28 and each is positioned approximately midway between the shaft aperture 28 and the adjacent arcuate side 26 or 27. First and second bolts 41 and 42 provided with washers 43 and nuts 44 are disposed longitudinally through the transverse slots 37 and 38. The washers are placed between the planar sides 24 and 25 and the nuts 44 or heads of the bolts as the case may be.

Figure 1:
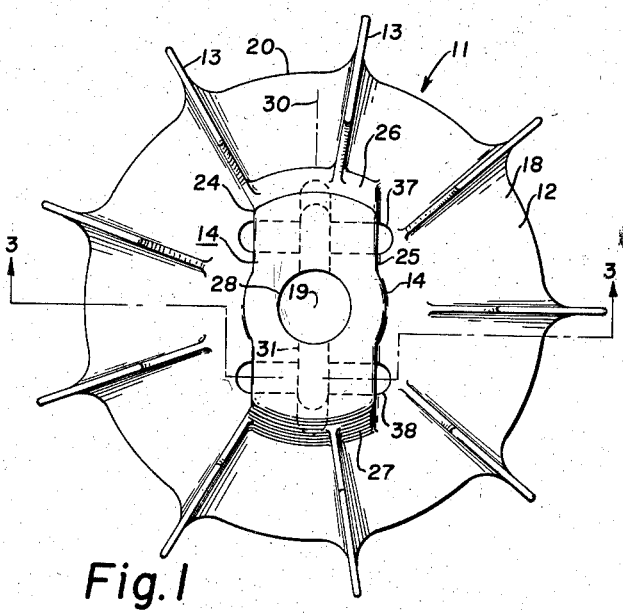
Figure 1 is a front view of the fan assembly.
Figure 2:
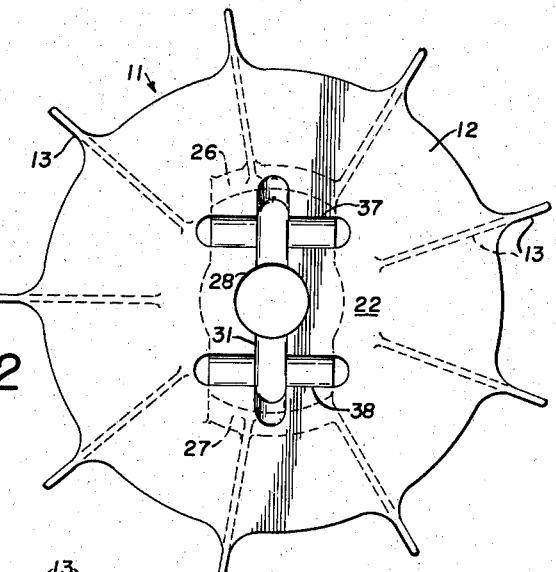
Figure 2 is a rear view of the fan assembly.

The fan assembly 11 may be used with an electric motor 45 or other dynamoelectric machine which has the shaft 15 and on which the fan assembly is to be mounted for a driving connection. With the shaft aperture 28 having preferably a slightly greater diameter than the shaft 15, the hub 14 may readily be inserted on this shaft 15. The bolts 41 and 42 together with the nuts 44 provide a means for compressing the hub 14 in a direction generally perpendicular to the longitudinal reference plane 30 so that the shaft aperture 28 contracts slightly to frictionally and drivingly engage the shaft 15. The entire fan assembly may be made from a plastic material as shown or may be made from other suitable materials, even soft materials such as aluminum. A feature of the invention is that the fan assembly 11 may be economically and easily manufactured in one piece and in one operation. It may be molded or cast in a two-part mold with the mold halves parting along a line at the periphery 20 of the disc 12. This is because all surfaces on one side of the fan assembly, as shown in Figure 1, are within ninety degrees of the plane of the outer face surface 18 of the disc 12 with this outer face surface 18 being generally normal to the shaft axis 19. Also, as shown in Figure 2, all surfaces on the rear side of the fan assembly 11 are within ninety degrees of the plane of the second face 22 of the hub 14. This means that all slots 31, 37, and 38 may be produced by the two mold halves for easy and economical manufacture. This is a distinct advantage in using the transverse slots 37 and 38 which extend through the hub from the face 22 rather than using cored or drilled holes in place of these transverse slots 37 and 38.

Figure 3:
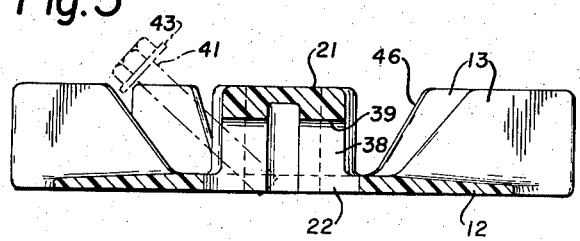
Figure 3 is a sectional view on the line 3—3 of Figure 1.

There has been shown an odd number of fan blades 13 to illustrate the point that access to the right end of the transverse slots 37 and 38, as viewed in Figure 1, is different than the access to the left end of these slots. This different access would in many cases preclude using a drill to drill transverse holes in place of the transverse slots 37 and 38. By the use of these transverse slots, therefore, the difficulties of drilling are avoided. Also, the transverse slots aid in another way as shown by the phantom view of the bolt 41 in Figure 3. The radially disposed fan blades 13 may have sloping sides 46 which come closely adjacent the hub 14, and thus the bolts 41 and 42 may need to be tilted at an acute angle for insertion as shown in Figure 3. The slots 37 and 38 extending completely through the face 22 of the hub 14 permit this tilting of the bolts for this ready insertion or removal.

The outer face 21 of the hub 14 is completely closed which has two functions. First, it presents a solid surface of material integral with the rest of the hub 14 and integral with the disc 12 so that the material of the fan assembly, which may be plastic, is positioned in such a manner that a compressive stress is essentially all that is applied to the hub when the bolts are tightened for fastening the fan assembly to the shaft 15. Second, the completely closed face 21 aids materially in preventing any dirt or other foreign matter from entering along the shaft, between the shaft 15 and the hub 14. As shown in Figure 4, this fan assembly may be used on a motor 45 and often a bearing of the shaft will be positioned immediately adjacent the fan assembly. Therefore, this completely closed face and tight fit on the shaft materially aid in preventing entrance of foreign matter to any such bearing. Also, the compressive stresses applied to the hub 14 by the bolts utilize the greatest strength of the plastic or other material of which the fan assembly is made so that the stresses caused by the clamping will not be excessive. Also, because the stresses are principally compressive, any metallic inserts within the hub at and near the slots 31, 37, and 38 are not required, thus, simplifying and economizing manufacture. Still further, these compressive forces in not exceeding the elastic limit of the hub material assure that the hub will spring back to its original size upon loosening the bolts, and thus the entire fan assembly is readily removable. The fan assembly being one-piece plastic is corrosion resistant and non-sparking, which attributes are desirable for use in corrosive or explosive atmospheres.

The bolts 41 are illustrative of a means of compressing the periphery of the hub 14 so that a compressive force perpendicular to the longitudinal plane 30 is applied, which in turn contracts the shaft aperture 28. The shaft aperture 28 has been shown as extending completely through hub 14, but in certain applications it will be appreciated that the face 21 of the hub may be completely closed and the shaft aperture 28 merely extends to a position adjacent this closed end 21. The longitudinal slot 31 is a slot which extends radially outwardly from the shaft aperture 28 or at least extends in a direction from the shaft aperture to a location in the hub 14 of greater radius than the shaft aperture 28 and provides a generally radial opening which may be compressed by the bolts and nuts to contact the shaft aperture 28.

By use of the transverse slots 37 and 38 rather than using transverse holes which would have to be either cored or drilled, this permits improved functional design of the fan blades so that the blades may be either radial or curved and may be placed at any functionally desired position with much greater freedom of choice than would otherwise be found if cored or drilled holes had to be provided.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fan assembly for driving connection to a rotating shaft, comprising, a disc having an axis, fan blades symmetrically disposed about said axis and carried on said disc, a hub having first and second faces with the entire hub fixedly connected at said second face to one side of said disc and coaxial therewith, a shaft aperture coaxial with said hub and said disc and extending through said hub and disc to receive a shaft, said first face on said hub being completely closed except for said shaft aperture and being closed when received on any said shaft, a peripheral surface on said hub smaller than the periphery of said disc, first and second planar sides as part of said peripheral surface and disposed substantially parallel, a longitudinal slot substantially symmetrically disposed relatively to a longitudinal plane containing said axis and disposed substantially parallel to and midway between said planar sides of said hub, said slot extending through said disc and into said hub only to a depth adjacent the closed face of said hub, a transverse slot in said hub generally perpendicular to said longitudinal plane and spaced generally midway between said shaft aperture and said peripheral surface and extending completely through said hub from one planar side to the other, and bolt and nut means extending through said transverse slot and bearing against said planar sides to compress said hub onto any said shaft in a direction perpendicular to said longitudinal slot and said transverse slot communicating with said one side of said disc to receive said bolt and nut means from said one side.

2. A readily removable fan assembly for a shaft, comprising, a disc having an axis, fan blades symmetrically disposed about said axis and carried on one side of said disc, a complete annular hub carried on said one side of said disc and coaxial therewith, first and second planar sides substantially parallel and oppositely disposed on said hub, a shaft aperture coaxial with said hub and said disc and extending through said hub and disc to receive a shaft, a face on said hub opposite said disc with said face being closed at least when said hub is received on any said shaft, a longitudinal slot substantially symmetrically disposed relatively to a longitudinal plane containing said axis and disposed substantially parallel to and midway between said planar sides of said hub, said slot extending through said disc and into said hub to a depth adjacent the closed face of said hub, first and second transverse slots in said hub each generally perpendicular to said longitudinal plane and spaced equidistant on each side of said axis and extending completely through said hub from one planar side to the other, and first and second bolt and nut means extending through said transverse apertures and bearing against said planar sides to compress said hub onto any said shaft in a direction perpendicular to said longitudinal slot and said transverse slots communicating with said one side of said disc to receive said bolt and nut means from said one side.

3. A readily removable fan assembly for an electric motor having a shaft, comprising, a disc having an axis, fan blades symmetrically disposed about said axis and carried on the outer edge of said disc and extending substantially half the radial distance toward said axis, a complete annular hub carried on one side of said disc and coaxial therewith, first and second planar sides substantially parallel and oppositely disposed on said hub, a shaft aperture coaxial with said hub and said disc and extending through said hub and disc to receive the shaft of an electric motor, a face on said hub opposite said disc with said face being closed when said hub is received on any said shaft, a longitudinal slot substantially symmetrically disposed relatively to a longitudinal plane containing said axis and disposed substantially parallel to and midway between said planar sides of said hub, said slot extending through said disc and into said hub only to a depth adjacent the closed face of said hub, first and second transverse slots each generally perpendicular to said longitudinal plane and spaced equidistant on each side of said axis and extending completely through said disc and through said planar sides to an area closely adjacent the closed face of said hub, and first and second bolt and nut means extending through said transverse slots and bearing against said planar sides to compress said hub onto the shaft of any said electric motor in a direction perpendicular to said longitudinal slot.

4. A readily removable plastic fan for an electric motor having shaft, comprising, an integral molded plastic hub, disc and fan blade assembly, the disc of said assembly having an axis, the fan blades of said assembly being symmetrical about said axis and carried on one side of said disc near the outer edge and extending substantially half the radial distance toward said axis, said hub of said assembly being carried on said one side of said disc and coaxial therewith, first and second oppositely disposed planar sides and first and second oppositely disposed arcuate sides on said hub, a shaft aperture coaxial with said hub and said disc and extending through said hub and disc to receive the shaft of an electric motor, a face closed except for said shaft aperture on said hub opposite said disc, a longitudinal slot symmetrically disposed on a longitudinal plane containing said axis and disposed substantially parallel to and midway between said planar sides of said hub, said slot extending through said disc on both sides of said shaft aperture and to an area closely adjacent the closed face of said hub and closely adjacent said arcuate sides, first and second transverse slots each generally perpendicular to said longitudinal plane and spaced equidistant on each side of said axis and each approximately midway between said shaft aperture and said hub arcuate sides and extending completely through said disc and through said planar sides to an area closely adjacent the closed face of said hub, and first and second bolt and nut means extending through said tranverse slots and bearing against said planar sides to compress said hub onto the shaft of any said electric motor in a direction perpendicular to said longitudinal slot, said shaft aperture initially having a small radial clearance relative to said electric motor shaft and whereby said bolt and nut means may compress said hub at said longitudinal slot sufficiently to eliminate at least part of said radial clearance.

5. A connection for a rotatable body and a rotatable shaft, comprising, a disc on said body having an axis, a complete annular hub carried on one side of said disc and coaxial therewith, first and second planar sides substantially parallel and oppositely disposed on said hub, a shaft aperture coaxial with said hub and said disc and extending through said hub and disc to receive a shaft, a face on said hub opposite said disc with said face being closed when said hub is received on any said shaft, a longitudinal slot substantially symmetrically disposed relatively to a longitudinal plane containing said axis and disposed substantially parallel to and midway between said planar sides of said hub, said slot extending through said disc and into said hub only to a depth adjacent the closed face of said hub, first and second transverse slots each generally perpendicular to said longitudinal plane and spaced equidistant on each side of said axis and extending completely through said disc and through said planar sides to an area closely adjacent the closed face of said hub, and first and second bolt and nut means extending through said transverse slots and bearing against said planar sides to compress said hub onto any said shaft in a direction perpendicular to said longitudinal slot.

6. A connection for a readily removable rotatable body and a rotatable shaft, comprising, an integral hub and disc assembly, the disc of said assembly having an axis, said hub of said assembly being carried on one side of said disc and coaxial therewith, first and second oppositely disposed planar sides and first and second oppositely disposed arcuate sides on said hub, a shaft aperture coaxial with said hub and said disc and extending through said hub and disc to receive a shaft, a face closed except for said shaft aperture on said hub opposite said disc, a longitudinal slot symmetrically disposed on a longitudinal plane containing said axis and disposed substantially parallel to and midway between said planar sides of said hub, said slot extending through said disc on both sides of said shaft aperture and to an area closely adjacent the closed face of said hub and closely adjacent said arcuate sides, first and second transverse slots each generally perpendicular to said longitudinal plane and spaced equidistant on each side of said axis and each approximately midway between said shaft aperture and said hub arcuate sides and extending completely through said disc and through said planar sides to an area closely adjacent the closed face of said hub, and first and second bolt and nut means extending through said transverse slots and bearing against said planar sides to compress said hub onto a shaft in a direction perpendicular to said longitudinal slot, said shaft aperture initially having a small radial clearance relative to said shaft and whereby said bolt and nut means may compress said hub at said longitudinal slot sufficiently to eliminate at least part of said radial clearance.

References Cited in the file of this patent

UNITED STATES PATENTS

| 653,313 | Raifsnyder | July 10, 1900 |
| 1,201,863 | Orey | Oct. 17, 1916 |
| 2,108,331 | Graves | Feb. 15, 1938 |
| 2,136,160 | Tinnerman | Nov. 8, 1938 |
| 2,291,944 | Bonanno | Aug. 4, 1942 |
| 2,487,128 | Hawn | Nov. 8, 1949 |
| 2,669,188 | McIntyre | Feb. 16, 1954 |
| 2,688,930 | De Moss | Sept. 14, 1954 |

OTHER REFERENCES

American Hard Rubber Co. (publication) "Ace Hard Rubber Centrifugal Pump" (received U. S. Patent Office Feb. 14, 1935). (Copy in Div. 9.)